United States Patent
Walsh et al.

(10) Patent No.: US 8,756,445 B2
(45) Date of Patent: Jun. 17, 2014

(54) PROVIDING POWER TO AN ACCESSORY DURING PORTABLE COMPUTING DEVICE HIBERNATION

(75) Inventors: Robert Walsh, Sunnyvale, CA (US); Jeff Terlizzi, San Francisco, CA (US); Jahan Minoo, San Jose, CA (US); Lawrence G. Bolton, Fremont, CA (US)

(73) Assignee: Apple Inc., Cupertino, CA (US)

( * ) Notice: Subject to any disclaimer, the term of this patent is extended or adjusted under 35 U.S.C. 154(b) by 682 days.

(21) Appl. No.: 12/793,364

(22) Filed: Jun. 3, 2010

(65) Prior Publication Data

US 2011/0167287 A1 Jul. 7, 2011

Related U.S. Application Data

(60) Provisional application No. 61/292,626, filed on Jan. 6, 2010.

(51) Int. Cl.
*G06F 1/26* (2006.01)

(52) U.S. Cl.
USPC .......................................................... 713/323

(58) Field of Classification Search
USPC .......................................................... 713/323
See application file for complete search history.

(56) References Cited

U.S. PATENT DOCUMENTS

| 5,150,031 | A | 9/1992 | James et al. |
| 5,483,656 | A | 1/1996 | Oprescu et al. |
| 5,754,027 | A | 5/1998 | Oglesbee et al. |
| 5,799,196 | A | 8/1998 | Flannery |
| 5,845,217 | A | 12/1998 | Lindell et al. |
| 5,867,718 | A * | 2/1999 | Intrater et al. ................. 713/323 |
| 6,012,105 | A | 1/2000 | Rubbmark et al. |
| 6,125,455 | A | 9/2000 | Yeo |
| 6,130,518 | A | 10/2000 | Gabehart et al. |
| 6,161,027 | A | 12/2000 | Poirel |
| 6,169,387 | B1 | 1/2001 | Kaib |
| 6,184,652 | B1 | 2/2001 | Yang |
| 6,184,655 | B1 | 2/2001 | Malackowski |

(Continued)

FOREIGN PATENT DOCUMENTS

| JP | 2001-242965 A | 9/2001 |
| JP | 2003-044177 A | 2/2003 |

(Continued)

OTHER PUBLICATIONS

International Search Report and Written Opinion corresponding to the PCT application No. PCT/US2010/049919, date of mailing Jan. 19, 2011, 9 pages total.

(Continued)

*Primary Examiner* — Kim Huynh
*Assistant Examiner* — Eric Chang
(74) *Attorney, Agent, or Firm* — Kilpatrick Townsend & Stockton LLP

(57) ABSTRACT

A portable computing device (PCD) can selectively supply power to an accessory during PCD hibernation. In some embodiments, the PCD's default behavior is to disable accessory power output during hibernation, and this default behavior can be overridden in response to a request from a connected accessory. The accessory can use the power supplied during PCD hibernation to detect user input (or other) events and wake the PCD from hibernation in response to a detected event. Some accessories can wake the PCD by emulating accessory detachment and reattachment.

26 Claims, 7 Drawing Sheets

(56) References Cited

U.S. PATENT DOCUMENTS

| | | | |
|---|---|---|---|
| 6,204,637 B1 | 3/2001 | Rengan | |
| 6,211,649 B1 | 4/2001 | Matsuda | |
| 6,230,277 B1 * | 5/2001 | Nakaoka et al. | 713/320 |
| 6,271,605 B1 | 8/2001 | Carkner et al. | |
| 6,316,916 B2 | 11/2001 | Bohne | |
| 6,353,894 B1 | 3/2002 | Pione | |
| 6,526,287 B1 | 2/2003 | Lee | |
| 6,614,232 B1 | 9/2003 | Mukai | |
| 6,653,813 B2 | 11/2003 | Khatri | |
| 6,653,816 B2 | 11/2003 | Peek et al. | |
| 6,663,420 B1 | 12/2003 | Xiao | |
| 6,813,528 B1 | 11/2004 | Yang | |
| 6,995,963 B2 | 2/2006 | Fadell et al. | |
| 7,032,120 B2 | 4/2006 | El-Kik et al. | |
| 7,167,935 B2 | 1/2007 | Hellberg | |
| 7,215,042 B2 | 5/2007 | Yan | |
| 7,231,532 B2 * | 6/2007 | Proefrock et al. | 713/323 |
| 7,293,122 B1 | 11/2007 | Schubert | |
| 7,441,062 B2 | 10/2008 | Novotney et al. | |
| 7,523,338 B2 | 4/2009 | Fu et al. | |
| 7,558,894 B1 | 7/2009 | Lydon et al. | |
| 7,624,202 B2 | 11/2009 | Monks et al. | |
| 7,673,020 B2 | 3/2010 | Rosenbloom et al. | |
| 7,746,032 B2 | 6/2010 | Tupman et al. | |
| 7,770,036 B2 | 8/2010 | Dorogusker et al. | |
| 8,001,285 B1 * | 8/2011 | Bar-Shalom | 710/5 |
| 8,166,330 B2 * | 4/2012 | Pickholz et al. | 713/330 |
| 2001/0003205 A1 | 6/2001 | Gilbert | |
| 2001/0006884 A1 | 7/2001 | Matsumoto | |
| 2002/0132651 A1 | 9/2002 | Jinnouchi | |
| 2003/0107566 A1 | 6/2003 | Shin et al. | |
| 2003/0110403 A1 | 6/2003 | Crutchfiled et al. | |
| 2003/0135766 A1 | 7/2003 | Zyskowski et al. | |
| 2003/0220988 A1 | 11/2003 | Hymel | |
| 2004/0003300 A1 | 1/2004 | Malueg et al. | |
| 2004/0103223 A1 | 5/2004 | Gabehart et al. | |
| 2004/0224638 A1 | 11/2004 | Fadell et al. | |
| 2008/0065246 A1 | 3/2008 | Zorkendorfer et al. | |
| 2009/0033277 A1 | 2/2009 | Ludtke | |
| 2009/0179768 A1 | 7/2009 | Sander et al. | |
| 2010/0180132 A1 | 7/2010 | Wu et al. | |

FOREIGN PATENT DOCUMENTS

| | | |
|---|---|---|
| JP | 2003-195989 A | 7/2003 |
| JP | 2006-330770 A | 12/2006 |
| WO | WO 99/26330 A2 | 5/1999 |
| WO | WO 00/39907 A1 | 7/2000 |

OTHER PUBLICATIONS

International Preliminary Report on Patentability with Written Opinion for PCT Application No. PCT/US2010/049919, mailed Jul. 19, 2012; 6 pages.

Japanese Office Action mailed on Sep. 17, 2013 for US Patent Application No. 2012-548002, English translation only, 2 pages.

Mexican Office Action mailed on Oct. 22, 2013 for MX Patent Application No. MX/a/2012/007886, 3 pages.

Korean Office Action mailed on Oct. 21, 2013 for KR Patent Application No. 10-2012-7020444, with English Translation, 14 pages.

Australian Office Action mailed on Sep. 16, 2013 for AU Patent Application No. 2010340314, 3 pages.

* cited by examiner

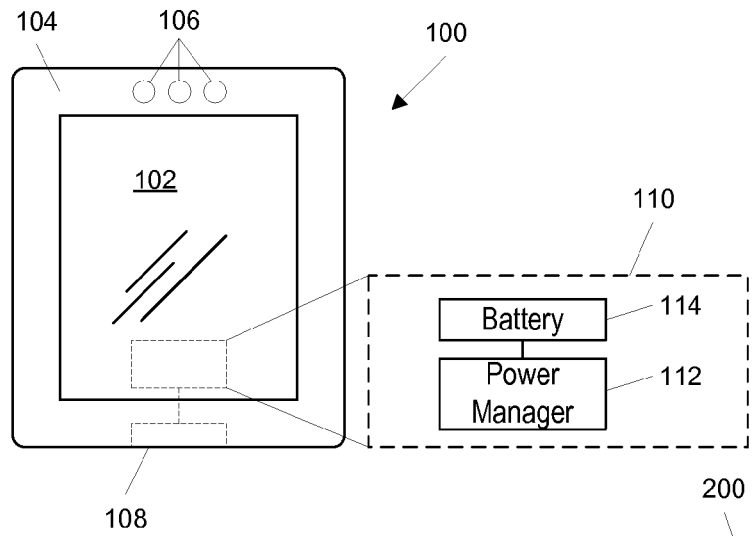
FIG. 1
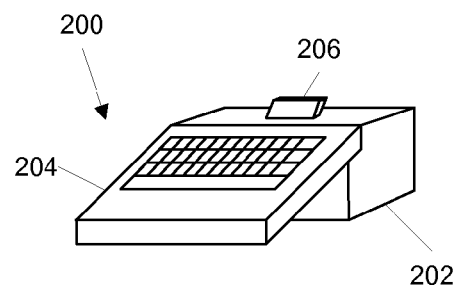
FIG. 2A
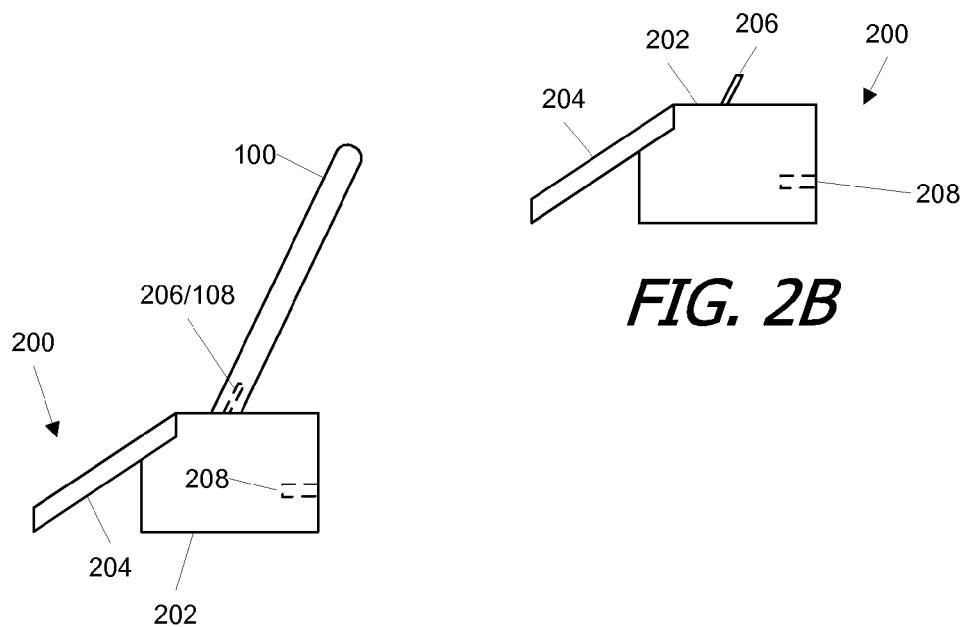
FIG. 2B
FIG. 3

| COMMAND | DIRECTION | PAYLOAD |
|---|---|---|
| HibPowerRequest | A → P | Hib mode ID, power level |
| HibNotify | P → A | Hib mode ID |

PROVIDING POWER TO AN ACCESSORY DURING PORTABLE COMPUTING DEVICE HIBERNATION

CROSS REFERENCE TO RELATED APPLICATIONS

This application claims the benefit of U.S. Provisional Application No. 61/292,626, filed Jan. 6, 2010, entitled "Providing Power to an Accessory During Portable Computing Device Hibernation," the disclosure of which is incorporated by reference herein in its entirety.

BACKGROUND

The present disclosure relates generally to portable computing devices that interact with accessories and in particular to providing power from a portable device to an accessory during hibernation of the portable computing device.

In recent years, a number of portable computing devices (PCDs) have been developed. Examples of PCDs include portable media players, mobile phones, personal digital assistants (PDAs), portable e-mail devices, video game players, portable navigation units relying on Global Positioning System (GPS) satellite data, and multi-function devices that can integrate numerous functions such as media storage and playback, mobile phone, Internet access, e-mail, personal information management, game play, GPS/navigation capability, and the like. Examples of multi-function PCDs include various iPhone® and iPod® models manufactured and sold by Apple Inc., assignee of the present application, as well as other portable electronic devices made and sold by other manufactures and distributors under their respective brand names.

PCDs often obtain operating power from a battery within the device. Since a battery can provide only a finite amount of energy before requiring recharging or replacement, PCDs often employ various power-saving techniques to extend battery life. In one such technique, a PCD can be designed to transition into a "hibernation" mode in which some components of the device—such as components that consume significant fractions of the total energy (e.g., display screen, primary processor, etc.)—are powered down. Other components of the PCD can continue to receive power during hibernation, and these components generate wake-up events, or wake event signals, in response to which power is restored to the powered-down components. Thus, for example, the user can press a button on the PCD to wake it from hibernation, or a PCD can automatically wake itself from hibernation in response to an incoming phone call.

PCDs are frequently docked with other electronic devices, referred to herein as "accessories." For example, from time to time, a user may dock a PCD with a personal computer to synchronize media content and/or metadata, personal data, and the like. A user may at other times dock the same PCD with other electronic devices, such as an in-vehicle media system, a speaker dock, or the like. Some accessories may provide power to the PCD from an external source, e.g., to recharge the PCD's battery or for use as operating power, and may also use power from an external source for their own operations. Other accessories draw their operating power from the PCD.

BRIEF SUMMARY

Certain embodiments of the present invention relate to PCDs that can selectively supply power to an accessory during PCD hibernation. In some embodiments, the PCD's default behavior is to disable accessory power output during hibernation, but this default behavior can be overridden in response to a request from a connected accessory. The accessory can use the power supplied during PCD hibernation to detect user input or other events and wake the PCD from hibernation in response to a detected event. An accessory can wake the PCD, e.g., by emulating physical detachment and reattachment of the accessory.

One aspect of the invention relates to accessories for portable computing devices and methods of operation thereof. For example, an accessory can establish a connection to a portable computing device and receive operating power from the portable computing device via the connection. The accessory can communicate to the portable computing device that that the accessory should receive power from the portable computing device when the portable computing device is in a hibernation mode. While the portable computing device is hibernating, the accessory can continue to receive power from the portable computing device. The accessory can detect an "accessory event" (such as user input or any other event or circumstance that should result in waking the portable computing device), in response to which it can signal the portable computing device to wake from hibernation mode.

For example, an accessory can include an input/output (I/O) interface configured to connect to a portable computing device and to receive power from the portable computing device and a controller coupled to the I/O interface. The controller can be configured to send a request to the portable computing device to request that the accessory receive power while the portable computing device in a hibernation mode, to receive a notification from the portable computing device indicating that the portable computing device is entering the hibernation mode, to determine that the portable computing device should be awakened from the hibernation mode, and to generate a wake event signal in response to determining that the portable computing device should be awakened. For example the I/O interface can include a wake event generator, and the controller can be configured to control the wake event generator to generate the wake event signal. In some embodiments, the wake event signal can emulate detachment and reattachment of the accessory; in other embodiments, other wake event signals can be used.

In some embodiments, the portable computing device can have multiple hibernation modes, and the accessory can request to receive hibernation power in any or all of these modes. Further, in some embodiments, the accessory can also request a particular level of hibernation power for a given hibernation mode.

Another aspect of the invention relates to portable computing devices and methods of operation thereof. For example, a portable computing device can establish a connection to an accessory and provide power to the accessory, e.g., via a power pin. The portable computing device can determine whether the accessory requests hibernation power. When the portable computing device enters the hibernation mode, it can continue to provide power to the accessory if the accessory requested hibernation power or discontinue providing power to the accessory if the accessory did not request hibernation power.

For example, a portable computing device can include a processor, an accessory input/output (I/O) interface coupled to the processor and configured to connect to an accessory, and a power manager configured to deliver power from a power source to the accessory I/O interface and the processor. The power manager can be further configured to enter a hibernation mode and to return from the hibernation mode to a normal operating mode. The processor can be configured to instruct the power manager to provide power from the power source to the accessory via the accessory I/O interface and also configured to receive a request for hibernation power from the accessory via the accessory I/O interface. In response to such a request, the processor can instruct the power manager to continue to provide power to the accessory while in the hibernation mode. The power manager can be further configured such that upon entering the hibernation mode, providing of power to the accessory is discontinued unless the instruction to continue to provide power to the accessory was received prior to entering the hibernation mode.

The following detailed description together with the accompanying drawings will provide a better understanding of the nature and advantages of the present invention.

BRIEF DESCRIPTION OF THE DRAWINGS

FIG. 1 is a front view of a portable computing device (PCD) according to an embodiment of the present invention.

FIGS. 2A and 2B are, respectively, a front perspective view and side view of a dock for a PCD according to an embodiment of the present invention.

FIG. 3 is a side view of a PCD docked with a dock according to an embodiment of the present invention.

DETAILED DESCRIPTION

Figures 4, 5:
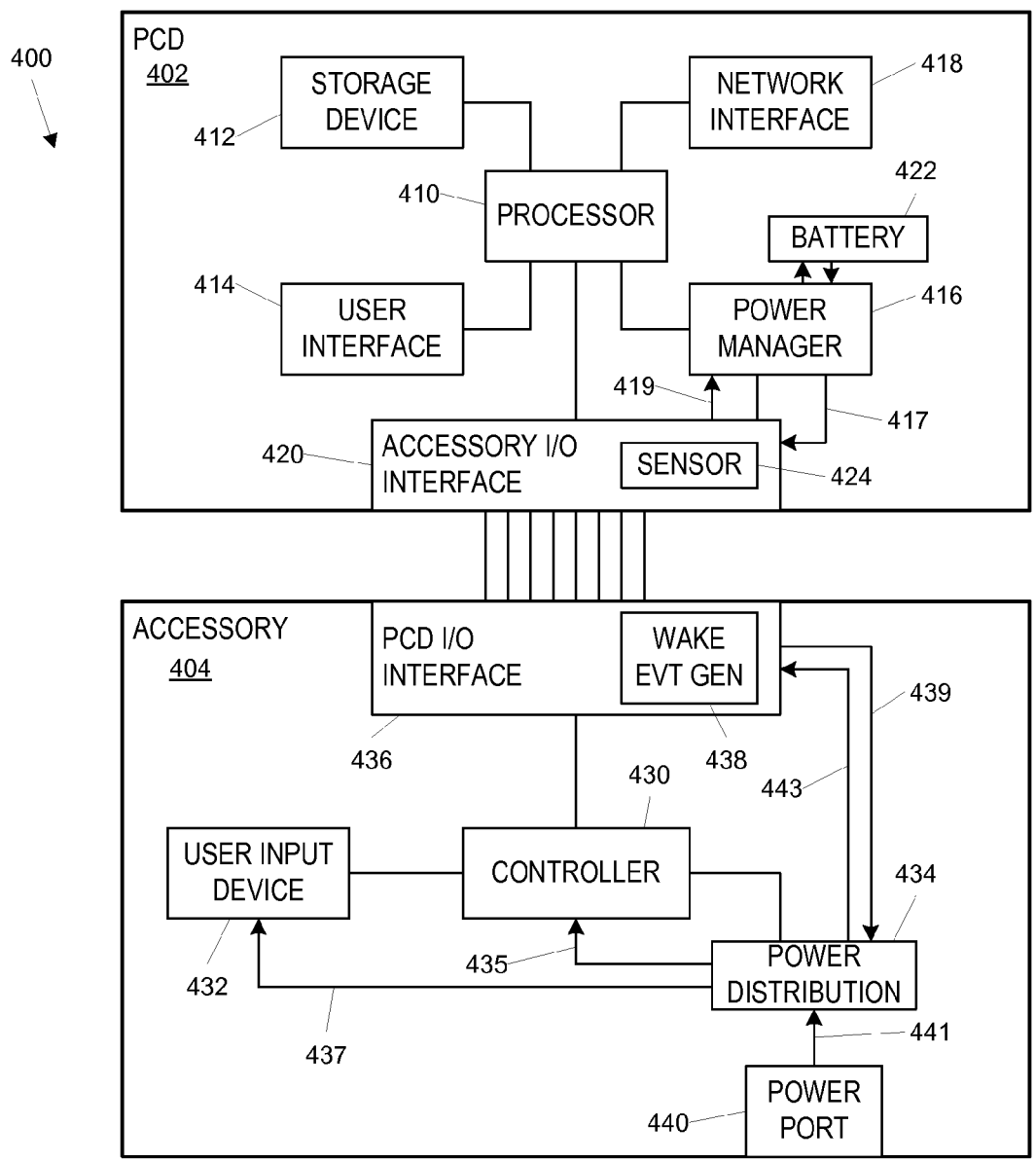
FIG. 4 is a simplified block diagram of a system including a PCD connected to an accessory according to an embodiment of the present invention.
FIG. 5 is a table listing power-management commands that can be provided according to an embodiment of the present invention.

Certain embodiments of the present invention relate to PCDs that can selectively supply power to an accessory during PCD hibernation. In some embodiments, the PCD's default behavior is to disable accessory power output during hibernation, but this default behavior can be overridden in response to a request from a connected accessory. The accessory can use the power supplied during PCD hibernation to detect user input or other events and wake the PCD from hibernation in response to a detected event. An accessory can wake the PCD, e.g., by emulating physical detachment and reattachment of the accessory.

FIG. 1 is a front view of a portable computing device (PCD) 100 according to an embodiment of the present invention. PCD 100 can have a touchscreen display 102 surrounded by bezel 104. Control buttons 106 are provided in bezel 104 and can be used, e.g., to wake PCD 100 from hibernation, to put PCD 100 into hibernation, or to provide other input to PCD 100.

PCD 100 can have a connector 108 recessed into a bottom surface thereof, allowing PCD 100 to become attached to an accessory device. Connector 108 can include a number of pins for carrying power, analog, and digital signals between PCD 100 and a connected accessory. In one embodiment, connector 108 can be implemented as a 30-pin docking connector as used in existing iPod® and iPhone® products sold by Apple Inc., assignee of the present application. In some embodiments, connector 108 is recessed into the housing of PCD 100 and is referred to as a "receptacle" connector. Other connectors can also be used.

As shown in inset 110, PCD 100 can have a power manager 112 and a battery 114 to provide power for the operation of PCD 100. Power manager 112 can provide power to various components of PCD 100 and to a connected accessory via connector 108. Power manager 112 can be configured to allow PCD 100 to enter a hibernation (i.e., reduced-power) mode under various conditions such as after a sufficiently long period of inactivity, thereby extending the operating life of battery 114. As described below, power manager 112 can also control whether accessory power continues to be supplied via connector 108 when PCD 100 enters the hibernation mode.

In the embodiment shown, PCD 100 can be a tablet computer with, e.g., a 10-inch screen. In other embodiments, PCD 100 can have a variety of form factors and configurations, e.g., smart phone, personal digital assistant, media player, portable web browser, etc.

FIGS. 2A and 2B are, respectively, a front perspective view and side view of a dock 200 for PCD 100 according to an embodiment of the present invention. Dock 200 has a base section 202, a keyboard 204, a PCD connector 206 and an accessory connector 208.

Base section 202 can include electronic components as well as mechanical ballast to provide stability to dock 200. Keyboard 204 can include a conventional QWERTY keyboard, numeric keypad, and/or other user input controls. Keyboard 204 can be mechanically and electrically coupled to base section 202, allowing keystroke information to be passed to PCD 100, e.g., via PCD connector 206.

PCD connector 206 can be designed to mate with connector 108 of PCD 100 of FIG. 1. For example, PCD connector 206 can be a "plug" counterpart of receptacle connector 108, extending outward from base section 202.

Accessory connector 208, shown in FIG. 2B, can be identical to connector 108 of PCD 100 of FIG. 1 and can allow an additional accessory to connect to dock 200. In this configuration, any accessory with a connector capable of connecting to connector 108 of PCD 100 can also connect to accessory connector 208 of dock 200. Use of complementary PCD connector 206 and accessory connector 208, while not required, permits another accessory to connect to PCD 100 either directly (by connecting to connector 108) or indirectly (by connecting to accessory connector 208 when connector 206 is connected to PCD 100).

In some embodiments, dock 200 need not have its own power supply. Instead, power can be provided to dock 200 by another device connected to accessory connector 208, or dock 200 can draw power from a connected PCD via connector 206.

FIG. 3 is a side view of PCD 100 docked with dock 200 according to an embodiment of the present invention. Connector 108 of PCD 100 is engaged with connector 206 of dock 200, providing electrical connections that allow power, data, and other signals to be exchanged between the two devices. Thus, for example, dock 200 can draw operating power from PCD 100. In some embodiments, as described below, dock 200 can draw operating power from PCD 100 while PCD 100 is hibernating; PCD 100 can supply this "hibernation power" to dock 200 in response to a request from dock 200.

It will be appreciated that the devices and configurations described herein are illustrative and that variations and modifications are possible. For example, as noted above, the term PCD refers generally to a broad category of personal computing and/or communication devices that can easily be carried by a user, not limited to any particular form factor or combination of capabilities.

The keyboard dock described herein is just one of many accessories that can be used with a PCD. For example, another accessory can provide a reader/writer for removable storage media such as flash memory media (e.g., Secure Digital, or "SD," cards; USB drives) or optical media (e.g., compact disc or DVD), and a PCD can be operated to direct the accessory to read data from and/or write data to the storage media. An accessory can provide output devices such as speakers and/or a display screen, allowing a user to view and/or hear content from the PCD through the accessory. A printer accessory can also be provided for printing documents or other data under control of the PCD. Still other accessories can provide enhanced functionality such as radio frequency (RF) tuners or transmitters that can be controlled by a PCD, remote user interfaces to control a PCD, still or video cameras that can be controlled by a PCD, and so on. Some accessories can provide multiple functionalities within a single device (e.g., keyboard plus storage media reader/recorder).

Further, while FIG. 3 shows PCD 100 and accessory 200 as being directly connected, indirect connections are also possible. For example, PCD 100 and accessory 200 can be connected using a cable that provides a connector complementary to connector 108 at one end and a connector complementary to connector 206 at the other end. Where a cable is used, connectors 108 and 206 need not be complementary to each other, as the cable can serve as an adapter between different connector form factors and/or pin arrangements.

FIG. 4 is a simplified block diagram of a system 400 including PCD 402 and accessory 404 according to an embodiment of the present invention. In this embodiment, PCD 402 (e.g., implementing PCD 100 of FIG. 1) can provide computing, communication and/or media playback capability. PCD 402 can include processor 410, storage device 412, user interface 414, power manager 416, network interface 418, accessory input/output (I/O) interface 420, and battery 422. PCD 402 can also include other components (not explicitly shown) to provide various enhanced capabilities.

Storage device 412 can be implemented, e.g., using disk, flash memory, or any other non-volatile storage medium. In some embodiments, storage device 412 can store media assets such as audio, video, still images, or the like, that can be played by PCD 402. Storage device 412 can also store other information such as a user's contacts (names, addresses, phone numbers, etc.); scheduled appointments and events; notes; and/or other personal information. In some embodiments, storage device 412 can store one or more application programs to be executed by processor 410 (e.g., video game programs, personal information management programs, media playback programs, etc.).

User interface 414 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 414 to invoke the functionality of PCD 402 and can view and/or hear output from PCD 402 via output devices of user interface 414.

Processor 410, which can be implemented as one or more integrated circuits (e.g., a conventional microprocessor or microcontroller), can control the operation of PCD 402. In various embodiments, processor 404 can execute a variety of programs in response to program code and can maintain multiple concurrently executing programs or processes. At any given time, some or all of the program code to be executed can be resident in processor 410 and/or in storage media such as storage device 412.

Through suitable programming, processor 410 can provide various functionality for PCD 402. For example, in response to user input signals provided by user interface 414, processor 410 can operate a database engine to navigate a database of media assets stored in storage device 412 in response to user input and display lists of selected assets. Processor 410 can respond to user selection of an asset (or assets) to be played by transferring asset information to a playback engine also operated by processor 410, thus allowing media content to be played. Processor 410 can also execute other programs to control other functions of PCD 402, including application programs that may be stored in storage device 412.

Power manager 416 provides power management capability for PCD 402. For example, power manager 416 can deliver power from battery 422 to accessory I/O interface 420 via line 417 and to other components of PCD 402 (power connections not shown). Power manager 416 can also receive power via accessory I/O interface 420 and line 419 and deliver received power to various components of PCD 402; power received via accessory I/O interface 420 can also be delivered to battery 422, thereby allowing battery 422 to be recharged via accessory I/O interface 420. As shown, power manager 416 can also deliver power to accessory I/O interface 420 via line 417, allowing PCD 402 to provide power to a connected accessory. In some embodiments, power manager 416 can be implemented using programmable or controllable circuits operating in response to control signals generated by processor 410 in response to program code executing thereon, or as a separate microprocessor or microcontroller.

Power manager 416 can also control power distribution to effect a hibernation mode for PCD 402. As used herein, "hibernation" refers generally to a reduced-power operating mode (or state) that is entered by selectively powering down some components of a PCD. Power manager 416 and some components of PCD 402 can remain partially or fully operational during hibernation, allowing PCD 402 to be awakened from hibernation. During hibernation, the user's ability to interact with PCD 402 can be limited. For example, during hibernation, display screens can be turned off, and some user input controls (e.g., a touchscreen) can be disabled. One or more user input controls (e.g., a button) can remain enabled, and operation of those controls during hibernation can signal PCD 402 to wake from hibernation and return to normal operation.

Power manager 416 can also provide other power management capabilities, such as regulating power consumption of other components of PCD 402 based on the source and amount of available power, monitoring stored power in the battery and generating user alerts if the stored power drops below a minimum level, and so on.

Network interface 418 can provide voice and/or data communication capability for PCD 402. In some embodiments network interface 418 can include radio frequency (RF) transceiver components for accessing wireless voice and/or data networks (e.g., using cellular telephone technology, advanced data network technology such as 3G or EDGE, WiFi (IEEE 802.11 family standards), or other mobile communication technologies, or any combination thereof), GPS receiver components, and/or other components. In some embodiments network interface 418 can provide wired network connectivity (e.g., Ethernet) in addition to or instead of a wireless interface. Network interface 418 can be implemented using a combination of hardware (e.g., antennas, modulators/demodulators, encoders/decoders, and other analog and/or digital signal processing circuits) and software components.

Accessory I/O interface 420 can allow PCD 402 to communicate with various accessories. For example, accessory I/O interface 420 can support connections to a computer, an external keyboard (e.g., as shown in FIG. 2), a speaker dock or media playback station, a digital camera, a radio tuner (e.g., FM, AM and/or satellite), an in-vehicle entertainment system, an external video device, a memory card reader, and so on. In some embodiments, accessory I/O interface 420 can include a connector, such as a 30-pin connector corresponding to the connector used on iPod® and iPhone® products, as well as supporting circuitry. The connector can provide connections for power and ground as well as for various wired communication interfaces such as Universal Serial Bus (USB), FireWire (IEEE 1394 standard), and/or universal asynchronous receiver/transmitter (UART). The connector can also provide connections for audio and/or video signals, which may be transmitted to or from PCD 402 in analog and/or digital formats. Thus, accessory I/O interface 420 can support multiple communication channels, and a given accessory can use any or all of these channels.

Accessory I/O interface 420 can include a sensor 424 that can detect whether an accessory is connected to accessory I/O interface 420. For example, sensor 424 can detect whether a specific pin of a connector of accessory I/O interface 420 is grounded or floating, and grounding of this pin can indicate the presence of an accessory. In some embodiments, sensor 424 can measure the resistance value when a resistance is connected. The resistance value can indicate of the type of accessory connected, and sensor 424 can communicate the resistance value (or accessory-type information determined from the resistance value) to power manager 416, processor 410, and/or other components of PCD 402. In some embodiments, power manager 416 can use this information to determine, e.g., whether to distribute power from the battery or power received from accessory I/O interface 420 to other components of PCD 402, whether to use power provided via accessory I/O interface 420 to charge battery 422, whether to deliver power to accessory I/O interface 420 and so on. In some embodiments, sensor 424 can remain active during PCD hibernation and can generate signals to power manager 416 to wake PCD 402 when a new connection to an accessory is detected.

Accessory 404 (e.g., implementing dock 200 of FIG. 2) can include controller 430, user input device 432, power distribution module 434, and PCD I/O interface 436. Accessory 404 is representative of a broad class of accessories that can interoperate with a PCD, and such accessories can vary widely in capability, complexity, and form factor. Various accessories may include components not shown in FIG. 4, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on. In addition, some accessories may provide an additional interface that can connect to and communicate with another accessory. Some examples of accessories with additional interfaces are described in co-pending U.S. Provisional Patent Application No. 61/292,619, filed Jan. 6, 2010.

Controller 430 can include, e.g., a microprocessor or microcontroller executing program code to perform various functions associated with accessory 404. For example, where accessory 404 incorporates a keyboard (e.g., as shown in FIG. 2A), controller 430 can interpret keyboard input and send corresponding information to PCD 402.

User input device 432 may include user-operable controls such as a touch pad, touch screen, scroll wheel, click wheel, dial, button, switch, keyboard, keypad, microphone, or the like. A user can operate the controls of user input device 432 to invoke the functionality of accessory 404, and such functionality may include exchanging control signals, data, or other communications with PCD 402, e.g., as described below.

Power distribution module 434 can provide power to components of accessory 404, e.g., to controller 430 (indicated by line 435) and user input device 432 (indicated by line 437). In some embodiments, power distribution module 434 can receive power via PCD I/O interface 436 (indicated by line 439). In addition, in some embodiments, accessory 404 can be connected to an external power source via power port 440, and power from port 440 can also be provided to power distribution module 434 (indicated by line 441). Power distribution module 434 can include control logic to determine, based on the available power sources at a given time, whether to draw operating power for accessory 404 from PCD 402 or from power port 440. Further, power distribution module 434 can be configured to deliver power from power port 440 to PCD I/O interface 436 (indicated by line 443), thus allowing PCD 402 to charge battery 422 while connected to accessory 404. In some embodiments, accessory 404 can draw operating power from PCD 402 while providing charging power to PCD 402 on a separate path.

PCD I/O interface 436 can allow accessory 404 to communicate with PCD 402. In accordance with some embodiments of the invention, PCD I/O interface 436 can include a connector that mates directly with a connector included in PCD 402, such as a 30-pin connector complementary to the connector used in various iPod® and iPhone® products. Such a connector can be used to supply power to PCD 402 and/or receive power from PCD 402, to send and/or receive audio and/or video signals in analog and/or digital formats, and to communicate information using various standard interfaces such as USB, UART, and/or FireWire. Other connectors may also be used; for example, PCD I/O interface 436 can incorporate a standard USB connector and can connect to accessory I/O interface 420 of PCD 402 via an adapter cable. In other embodiments, PCD I/O interface 436 can incorporate wireless communication (e.g., using Bluetooth) with accessory I/O interface 420.

PCD I/O interface 436 can include a wake event generator 438 that can generate wake event signals for transmission to PCD 402. Any signal that results in a hibernating PCD waking can be used as a wake event signal. For example, as described above PCD 402 can be configured to wake from hibernation if an accessory becomes attached to accessory I/O interface 420. Accordingly, wake event generator 438 can open and close a connection to a pin of a connector of PCD I/O interface 436 to emulate an accessory becoming attached.

Accessory 404 can be any electronic apparatus that interacts with PCD 402, including but not limited to keyboard dock 200 as shown in FIG. 2. In some embodiments, accessory 404 can provide remote control over operations of PCD 402, or a remote user interface that can include both input and output controls (e.g., a display screen). Accessory 404 in various embodiments can control any function of PCD 402 and can also receive media content from PCD 402 and present such content to the user (e.g., through audio speakers and/or video display screen, depending on the type of media content). In other embodiments, PCD 402 can control operations of accessory 404, such as retrieving stored data from a storage medium of accessory 404, initiating an image capture operation by a camera incorporated into accessory 404, etc.

It will be appreciated that the system configurations and components described herein are illustrative and that variations and modifications are possible. The PCD and/or accessory may have other capabilities not specifically described herein (e.g., mobile phone, global positioning system (GPS), broadband data communication, Internet connectivity, etc.).

Connectors at the respective I/O interfaces of the PCD and accessory can be complementary or not as desired. Where two connectors are not complementary, an adapter can be provided to connect the two devices. While connectors may be described herein as having pins, a term generally associated with conventional electronic devices having wires to connect components, it is to be understood that other signal paths (e.g., optical signaling) can be substituted. Further, in some embodiments, some of the connections can be wireless, and connectors can be omitted where wireless interfaces are provided.

Further, while the PCD and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Accessory I/O interface 420 of PCD 402 and PCD I/O interface 436 of accessory 404 allow PCD 402 to be connected with accessory 404 and subsequently disconnected from accessory 404. As used herein, a PCD and an accessory are "connected" whenever a communication channel is established between their respective interfaces and "disconnected" when the channel is terminated. Such connection can be achieved via direct physical connection, e.g., with mating connectors; indirect physical connection, e.g., via a cable; and/or wireless connection, e.g., via Bluetooth.

In some embodiments, a PCD and an accessory can communicate while connected by exchanging commands and data according to a PCD accessory protocol, also referred to herein as an "accessory protocol." The commands and data can be communicated, e.g., using any wired or wireless transport medium provided by the relevant interfaces.

The accessory protocol defines a format for messages to be exchanged between PCD 402 and any accessories connected thereto, such as accessory 404. For instance, the accessory protocol may specify that each message (also referred to herein as a command) is sent in a packet with a header and an optional payload. The header provides basic information (e.g., a start indicator, length of the packet, and a command code identifying a command to be processed by the recipient), while the payload provides any data associated with the command; the amount of associated data can be different for different commands, and some commands may provide for variable-length payloads. In some embodiments, the commands may be defined such that any particular command code is valid in only one direction. The packet can also include error-detection or error-correction codes as known in the art.

The accessory protocol can define a number of "lingoes," where a "lingo" is a group of related commands that can be supported (or unsupported) by various classes of accessories. In one embodiment, a command code can include a first byte identifying the lingo to which the command belongs and a second byte identifying the particular command within the lingo. Other command structures may also be used. It is not required that all accessories, or all PCDs to which an accessory can be connected, support every lingo defined within the accessory protocol.

In some embodiments, every accessory 404 and every PCD 402 that use the accessory protocol support at least a "general" lingo that includes commands common to the PCD and all accessories. The general lingo can include commands enabling the PCD and the accessory to identify and authenticate themselves to each other and to provide general information about their respective capabilities, including which (if any) other lingoes each supports. The general lingo can also include authentication commands that the PCD can use to verify the purported identity and capabilities of the accessory (or vice versa), and the accessory (or PCD) may be blocked from invoking certain (or all) commands or lingoes if the authentication is unsuccessful.

A PCD accessory protocol can also include various other lingoes, such as a simple remote lingo that allows an accessory to send a command indicating a function of the PCD to be invoked, a remote user interface lingo that can be used to communicate commands and data related to replicating all or part of a user interface of a PCD on an accessory (thereby supporting a more advanced remote control), a tuner lingo that allows a user to control a tuner accessory by operating the PCD and/or to control a tuner in the PCD by operating an accessory, a storage lingo that allows an accessory to store data on the PCD, and so on. Any lingo or combination of lingoes or other commands or groups of commands can be included in an accessory protocol.

In some embodiments, the accessory protocol can include commands related to power management. FIG. 5 is a table 500 listing power-management commands that can be provided according to an embodiment of the present invention.

A HibPowerRequest command can be sent from accessory 404 to PCD 402 in order to request that PCD 402 provide power to accessory 404 during PCD hibernation. (Power provided by a PCD to an accessory during PCD hibernation is referred to herein as "hibernation power.") In some embodiments, the request for hibernation power can be incorporated into an identification command that accessory 404 can send to PCD 402 to indicate its identity and preferences. In some embodiments, hibernation power can be either requested or not, and a payload is not required; PCD 402 can infer from the absence of a request for hibernation power that hibernation power should not be provided to the accessory.

In other embodiments, accessory 404 can specify a desired hibernation power level, which can be, e.g., lower than the normal operating power; for instance, the maximum current can be reduced while holding the voltage constant. For example, accessory 404 can draw just enough power during PCD hibernation to generate a wake event signal to PCD 402. Thus, accessory 404 can contribute to power savings by drawing minimal power when PCD 402 is hibernating. In other embodiments, accessory 404 can simply reduce its power consumption during PCD hibernation without specifying a desired hibernation power level. In still other embodiments, accessory 404 can draw more power during PCD hibernation than during normal operation.

In some embodiments, PCD 402 can support multiple hibernation modes, allowing optimized power consumption under varying conditions, and the payload of the HibPowerRequest command can include an identifier of one or more particular hibernation modes during which PCD 402 should supply hibernation power; in some embodiments, delivery of power during all hibernation modes can be selected, e.g., by not identifying a particular mode. In some embodiments where multiple hibernation modes are present, accessory 404 can request different power levels for different hibernation modes, e.g., by including appropriate parameters in the HibPowerRequest command. In some embodiments, an accessory can send a new HibPowerRequest command at any time to change its preferences regarding hibernation power.

A HibNotify command can be sent from PCD 402 to accessory 404 in order to notify accessory 404 that PCD 402 is entering hibernation. In embodiments where PCD 402 supports multiple hibernation modes, the payload of the HibNotify command can include an identifier of the particular hibernation mode being entered. Where only one hibernation mode is supported, the payload of the HibNotify command can be empty. Accessory 404 can use the HibNotify command to determine whether to generate wake event signals. In addition, the HibNotify command may trigger accessory 404 to reduce its own power consumption.

It will be appreciated that the commands shown in FIG. 5 are illustrative and that variations and modifications are possible. In some embodiments, a command can be provided to allow an accessory to register its preference for receiving or not receiving HibNotify commands. In other embodiments, the PCD can be configured such that any accessory that sends a HibPowerRequest command receives subsequent HibNotify commands, or the PCD can simply send a HibNotify command to any connected accessory to indicate that the PCD is entering hibernation, and the accessory can act on or ignore the command according to its particular configuration. In some embodiments, the PCD can send a WakeNotify command to a connected accessory upon exiting hibernation; in other embodiments, waking from hibernation can include reconnecting with accessories, in which case a WakeNotify command is not used.

Figure 6:
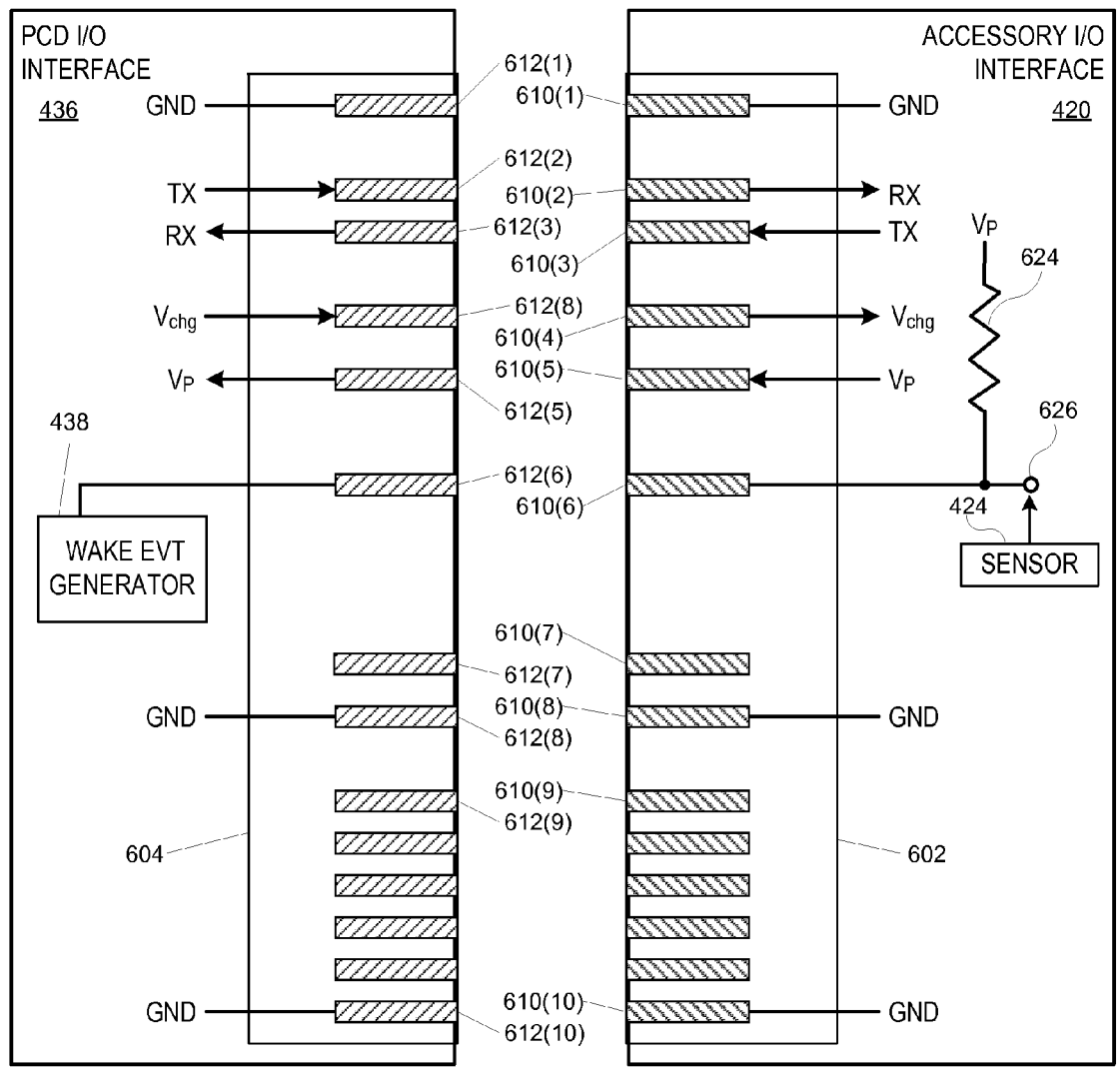
FIG. 6 is a simplified connection diagram illustrating connections that can be provided between an accessory and a PCD according to an embodiment of the present invention.

As noted above, accessory I/O interface 420 of PCD 402 and PCD I/O interface 436 of accessory 404 can each include a connector, and the two connectors can be complementary. FIG. 6 is a simplified connection diagram illustrating connections that can be provided between complementary connectors of an accessory and a PCD according to an embodiment of the present invention. Accessory-side connector 604 can be part of PCD I/O interface 436 of accessory 404 of FIG. 4, and PCD-side connector 602 can be part of accessory I/O interface 420 of PCD 402 of FIG. 4. In some embodiments, features of PCD-side connector 602 can be incorporated, e.g., into connector 108 of FIG. 1, and features of accessory-side connector 604 can be incorporated, e.g., into connector 208 of FIG. 2B.

In this example, PCD-side connector 602 provides a number of pins 610. (Herein, multiple instances of like objects are denoted with reference numbers identifying the object and parenthetical numbers identifying the instance where needed.) These pins can include a number of ground (GND) pins 610(1), 610(8) and 610(10); serial receive (RX) and transmit (TX) pins 610(2), 610(3) for exchanging serial-protocol signals with the accessory; $V_{chg}$ pin 610(4) that can receive charging power $V_{chg}$ (e.g., at 5.0 V) from an accessory; $V_P$ pin 610(5) that can provide operating power $V_P$ (e.g., at 3.3 V) to an accessory; and accessory detection pin 610(6). Other pins, e.g., pins 610(7) and 610(9), can provide signals not relevant to the present description, such as USB signals, FireWire signals, audio and/or video output signals to the accessory in digital and/or analog formats, audio and/or video input signals from the accessory, and so on. In one embodiment, PCD-side connector 602 can have a total of 30 pins; the number and arrangement of pins can be varied as desired. In some embodiments, ground pins 610(1), 610(2), 610(8) and 610(10) can be made longer than all other pins 610 so that the ground connections are first to be made and last to be broken as PCD-side connector 602 engages with and disengages from accessory-side connector 604. Such a configuration can reduce the risk of electrical damage to a PCD during docking and undocking.

Similarly, accessory-side connector 604 provides a number of pins 612 that can be brought into electrical contact with corresponding pins 610 of PCD-side connector 602. These pins can include ground pins 612(1), 612(8) and 612(10); serial TX and RX pins 612(2), 612(3) for exchanging serial-protocol signals with the PCD; $V_{chg}$ pin 612(4) that can provide charging power $V_{chg}$ (e.g., at 5.0 V) to a PCD; $V_P$ pin 612(5) that can receive operating power $V_P$ (e.g., at 3.3 V) from a PCD; and accessory detection pin 612(6). Other pins, e.g., pins 612(7) and 612(9) can provide signals not relevant to the present description, such as USB signals, FireWire signals, audio and/or video input signals from the PCD in digital and/or analog formats, audio output signals to the PCD, and so on. In one embodiment, accessory-side connector 604 can have a total of 30 pins; the number and arrangement of pins can be varied as desired.

PCD-side connector 602 and accessory-side connector 604 need not have the same form factor or number of pins; where this is the case, an adapter can be provided to facilitate connection between connectors 602 and 604. In some embodiments, a particular accessory might use only a subset of the pins provided by PCD-side connector 602. For example, if a particular accessory does not provide charging power to a PCD, $V_{chg}$ pin 612(8) can be disconnected. Any pins of accessory-side connector 604 that are not actually connected to the accessory can be left floating or terminated to prevent line noise as appropriate, or unused signal contacts may simply be omitted.

FIG. 6 also illustrates a technique that can be used in one embodiment to wake a PCD from hibernation by using signals sensed on accessory detection pin 610(6). In this configuration, PCD I/O interface 436 includes wake event generator 438, which can be connected to accessory detection pin 612(6). In accessory I/O interface 420, pin 610(6) is connected via a pull-up resistor 624 to a reference voltage (e.g., $V_P$, although a different voltage can be used).

In operation, when accessory-side connector 604 is connected to PCD-side connector 602, electrical contact is achieved between pins 612(6) and 610(6). If wake event generator 438 connects pin 612(6) to a specific voltage (e.g., ground), that voltage can be sensed at node 626 by sensor 434 of PCD 402. If no accessory is connected to PCD-side connector 604, sensor 424 can detect that pin 610(6) is in a floating state, allowing PCD 402 to determine that no accessory is attached. A transition from the floating state to a specific voltage on pin 610(6) can be detected by sensor 424 and associated with an accessory becoming attached. In some embodiments, sensor 424 can detect this transition while the PCD is hibernating and can initiate waking of the PCD, e.g., by sending an accessory attach signal to power manager 416 and/or processor 410. In some embodiments, sensor 424 can also detect a transition from a specific voltage to a floating state on pin 610(6) and can send an accessory detach signal to power manager 416 and/or processor 410. Some PCDs can wake from hibernation on accessory attachment but not on accessory detachment.

Figure 7:
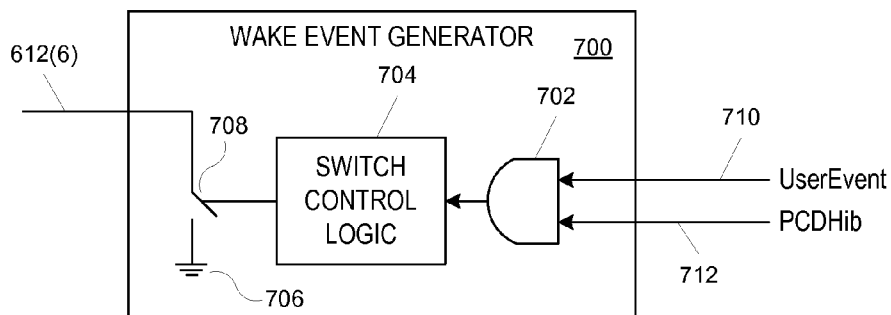
FIG. 7 is a simplified block diagram of a wake event generator for an accessory according to an embodiment of the present invention.

Wake event generator 438 can be designed to emulate physical detachment and reattachment of accessory 404. FIG. 7 is a simplified block diagram of wake event generator 700 (e.g., implementing wake event generator 438) according to an embodiment of the present invention. Wake event generator includes AND gate 702, switch control logic 704, and switch 708. Switch 708 can be coupled between pin 612(6) and ground 706. Switch control logic 704 can be coupled to control operation of switch 708 in response to a control signal from AND gate 702.

In this embodiment, AND gate 702 receives two input signals. The UserEvent signal on path 710 can indicate whether a user input event (e.g., a keypress event on a keyboard of accessory 404) has been detected. The PCDHib signal on path 712 can indicate whether a connected PCD is currently hibernating. If a user input event is detected while the PCD is hibernating, the output of AND gate 702 goes to a logic high state, and switch control logic 704 can respond by opening and then closing switch 708. When switch 708 is re-closed, sensor 424 (FIG. 6) detects the transition on pin 610(6) from a floating state to a grounded state, emulating attachment of an accessory, which initiates waking of the PCD from hibernation. In some embodiments, sensor 434 can also detect the transition from the grounded state to the floating state when switch 708 is opened and can initiate waking of the PCD in response to this transition. Wake event generator 700 can include additional control logic to avoid repeated toggling of switch 708.

It will be appreciated that the connector configuration and wake event generator described herein are illustrative and that variations and modifications are possible. Different numbers and/or arrangements of pins can be substituted. The connector form factors may also vary. Different accessories can connect to one power pin or the other, depending on whether the accessory draws power or delivers power and do not need to (but may) connect to both. In other embodiments, one power pin can be operated bidirectionally, with the PCD either receiving or supplying power on that pin.

In some embodiments described above, the wake event generator emulates detaching and reattaching the accessory, relying on the PCD being configured to automatically wake from hibernation when an accessory becomes attached. Other embodiments of a wake event generator are also possible. For example, the accessory-side and PCD-side connectors can include a dedicated signal pin on which the accessory can send a wake event signal, and the wake event generator can be configured to produce the wake event signal on this dedicated signal pin if a user input event is detected while the PCD is hibernating. In one such embodiment, the connector may include an interrupt pin that is used by the accessory to signal interrupts to the PCD, and the PCD can be configured to wake from hibernation on receipt of an interrupt signal. Thus, the accessory can wake the PCD by generating an interrupt signal. As another example, PCD 402 can be configured to monitor serial RX pin 610(2) during hibernation for incoming communications from accessory 404 and wake from hibernation if an incoming communication is detected. In such embodiments, accessory 404 can send a WakePCD command to wake the PCD or send a command including information about the user input event, which can be processed by PCD 402 after waking from hibernation.

Figure 8:
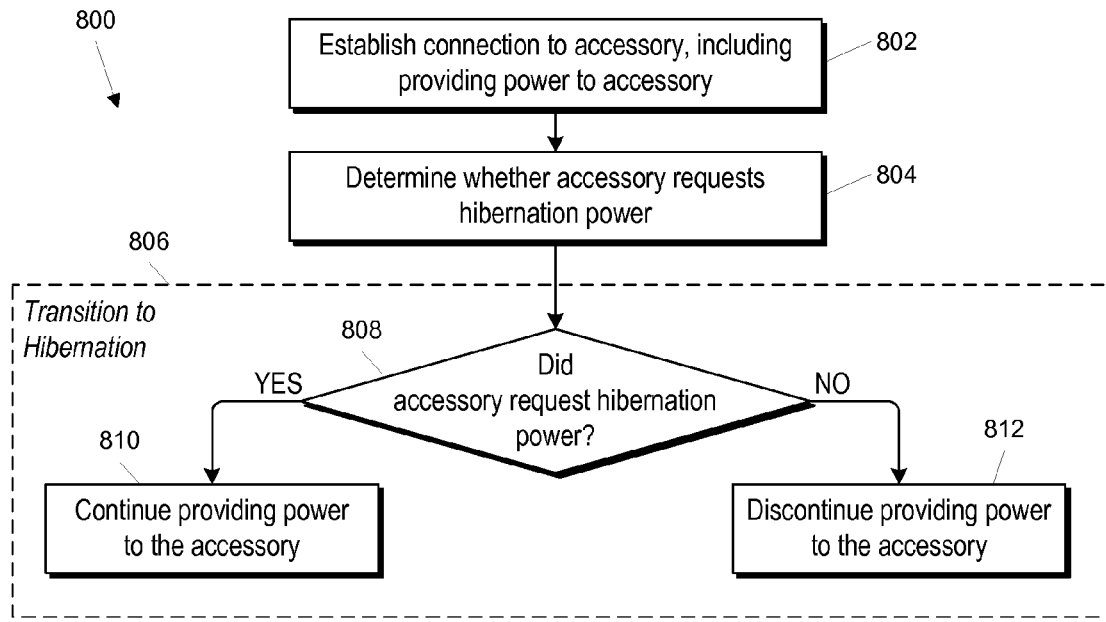
FIG. 8 is a flow diagram of a power management process that can be implemented in a PCD according to an embodiment of the present invention.

FIG. 8 is a flow diagram of a power management process 800 that can be implemented in a PCD (e.g., PCD 400) according to an embodiment of the present invention. At block 802, PCD 400 can establish a connection to an accessory (e.g., accessory 404). In addition to physical attachment, block 802 can include communicating information establishing the identity of accessory 404 to PCD 402 and/or of PCD 402 to accessory 404. At block 804, PCD 402 can determine whether accessory 404 requests hibernation power, for example, whether accessory 404 has sent a HibPowerRequest command. At some point, PCD 402 can transition to hibernation mode as indicated by dotted box 806. During the transition to hibernation mode, at block 808 if accessory 404 requested hibernation power, PCD 402 can continue to provide power to accessory 404 (block 810); otherwise, PCD 402 can discontinue providing power to accessory 402 (block 812). In some embodiments, PCD 402 can also notify accessory 404 that PCD 402 is entering hibernation, e.g., by sending a HibNotify command. PCD 402 can subsequently wake from hibernation in response to a wake event signal from accessory 402 or another source (e.g., internally generated).

Figure 9:
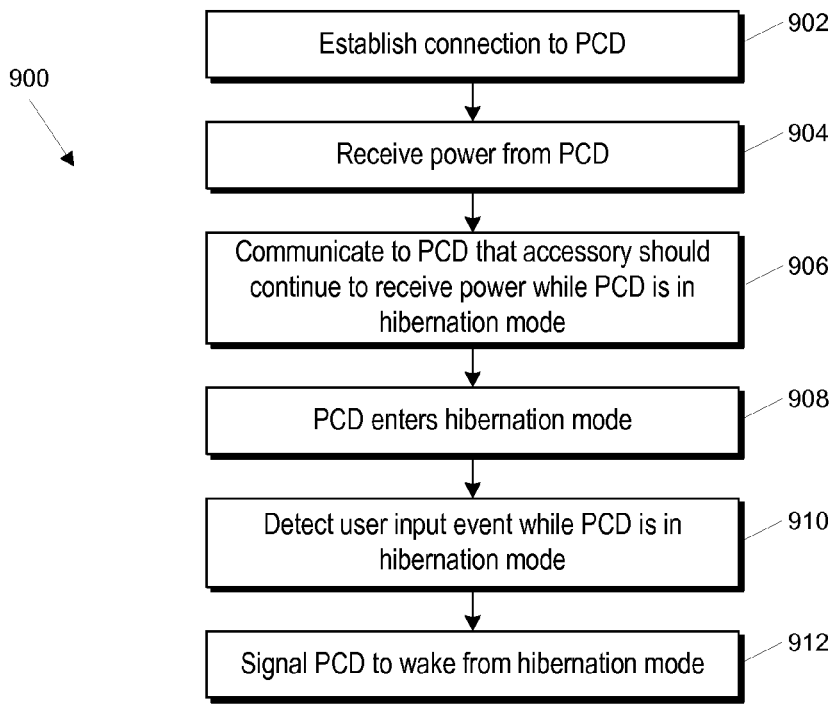
FIG. 9 is a flow diagram of a process that can be implemented in an accessory according to an embodiment of the present invention.

FIG. 9 is a flow diagram of a process 900 that can be implemented in an accessory (e.g., accessory 404) according to an embodiment of the present invention. At block 902, accessory 404 can establish a connection to a PCD (e.g., PCD 402). In addition to physical attachment, block 902 can include communicating information establishing the identity of accessory 404 to PCD 402 and/or of PCD 402 to accessory 404. At block 904, accessory 404 can receive power from PCD 402; in some embodiments, receiving power from PCD 402 can commence upon physical attachment of accessory 404 to PCD 402. At block 906, accessory 404 can communicate to PCD 402 that accessory 404 should continue to receive power while PCD 402 is in hibernation mode, e.g., by sending a HibPowerRequest command. At block 908, PCD 402 can enter hibernation mode; in some embodiments, accessory 404 can be notified when PCD 402 enters hibernation mode, e.g., using a HibNotify command. At block 910, accessory 404 can detect a user input event that occurs while PCD 402 is in hibernation mode. At block 912, accessory 404 can signal to PCD 402 to wake from hibernation, e.g., by generating a wake event signal as described above.

Figure 10:
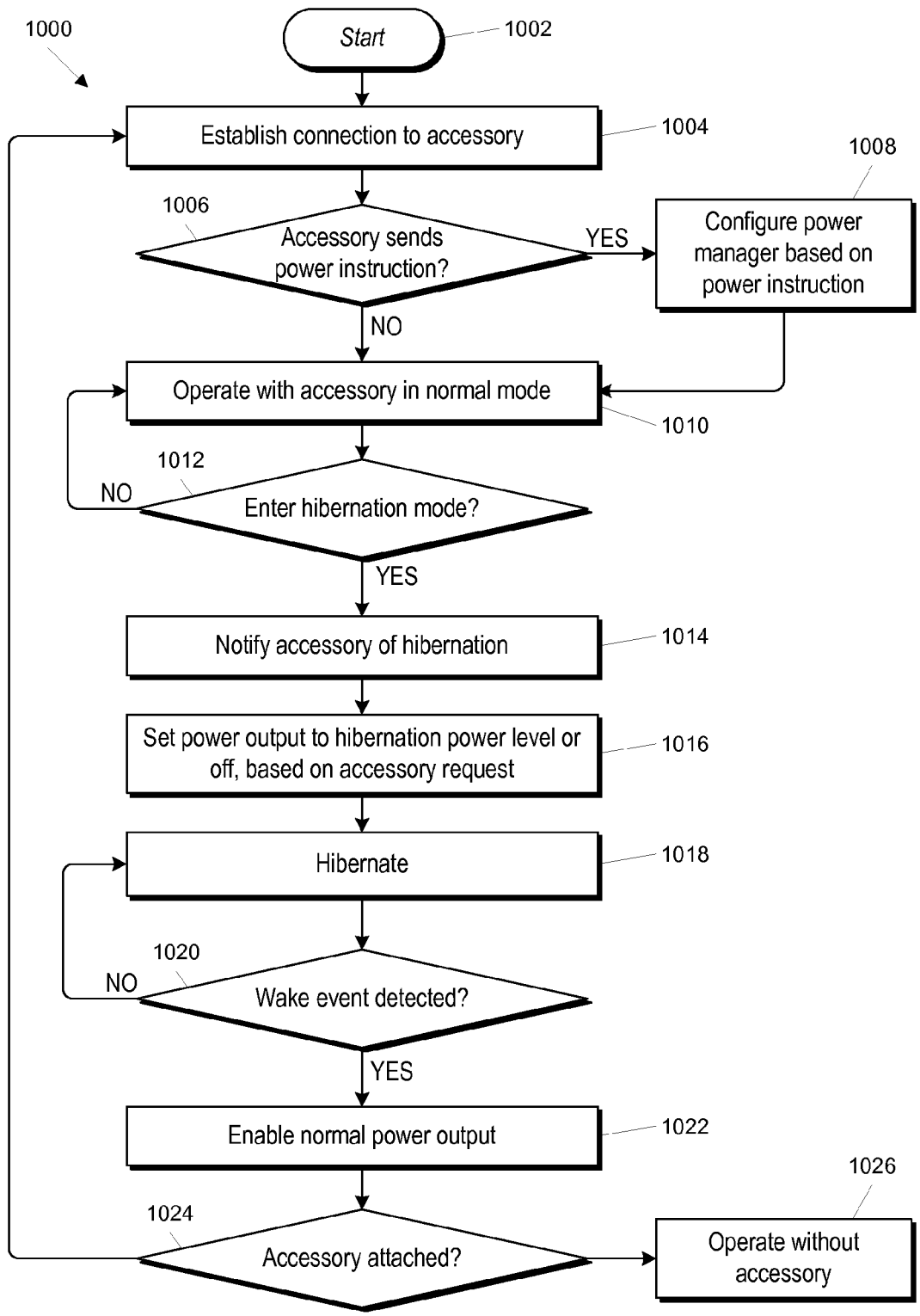
FIG. 10 is a flow diagram of a power management process that can be implemented in a PCD according to an embodiment of the present invention.
Figure 11:
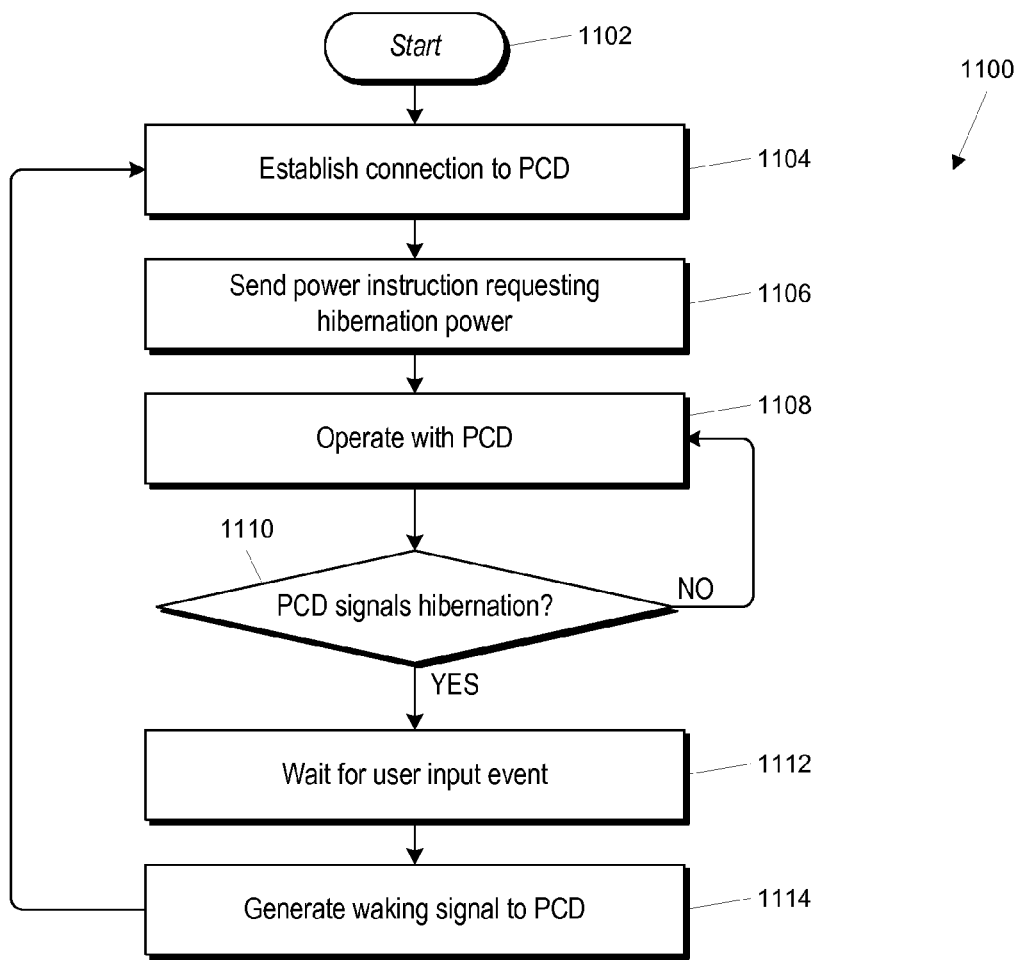
FIG. 11 is a flow diagram of a process for operating an accessory according to an embodiment of the present invention.

A further understanding of processes 800 and 900 can be had by reference to FIGS. 10 and 11. FIG. 10 is a flow diagram of a power management process 1000 that can be implemented in a PCD (e.g., PCD 402 of FIG. 4) according to an embodiment of the present invention. Process 1000 starts at block 1002, when an accessory (e.g., accessory 404 of FIG. 4) becomes attached to PCD 402. At block 1004, PCD 402 establishes a connection to accessory 404. Establishing a connection can include the accessory identifying itself, e.g., using an appropriate command (or commands) of the accessory protocol described above, and can also include an authentication procedure. Authentication can be cryptographic; for instance, accessory 404 can provide a digital certificate that PCD 402 can validate, then provide a digital signature of a random string generated by PCD 402. If identification or authentication fails, process 1000 can exit (not explicitly shown).

At block 1006, PCD 402 determines whether accessory 404 has sent a power instruction, e.g., the HibPowerRequest command described above. In some embodiments, an accessory can also send other power instructions in addition to or instead of the HibPowerRequest command, e.g., to indicate an amount of power required by the accessory, whether accessory power requirements can vary depending on the state of the accessory or PCD, etc. The HibPowerRequest command or other power instructions can be incorporated in the accessory-identifying information at block 1006, or they can be sent separately, e.g., after authentication has successfully completed. If accessory 404 does send power instructions, then at block 1008, PCD 402 can configure power manager 416 based on those instructions. For instance, in response to the HibPowerRequest command described above, power manager 416 can be instructed to maintain power output on line 417 during PCD hibernation. If no power instructions are received at block 1006, power manager 416 can remain in its default configuration, which can include turning off power output to line 417 during PCD hibernation.

At block 1010, PCD 402 operates with accessory 404 in a normal (i.e., non-hibernation) mode. Depending on the particular accessory and PCD, many types of operations can take place. Examples include PCD 402 receiving user input via accessory 404 (e.g., keystroke events where accessory 404 includes a keyboard) and processing the received input, PCD 402 providing media content or other output to accessory 404, PCD 402 controlling a function of accessory 404, accessory 404 controlling a function of PCD 402, and the like.

At block 1012, PCD 402 determines whether to enter hibernation mode. Hibernation mode can be entered based on the occurrence of various conditions, and block 1012 can include checking to determine if any of these conditions are met. For example, referring to FIG. 1, a user may press one of buttons 106 on PCD 100 to instruct PCD 100 to enter hibernation mode. As a second example, user input provided to PCD 402 via accessory 404 may result in PCD 402 entering hibernation mode; for instance, accessory 404 might have a "sleep" key that can be used to put PCD 402 into hibernation when accessory 404 communicates to PCD 402 that the "sleep" key has been pressed. As another example, PCD 402 may automatically enter hibernation mode after a specified period of inactivity, e.g., 2 minutes, 5 minutes or 10 minutes. In some embodiments, the period of inactivity that triggers hibernation can be a user-selectable parameter. If, at block 1012, none of the conditions for entering hibernation are met, PCD 402 can continue to operate with accessory 404 at block 1010.

If a condition for entering hibernation is met, PCD 402 can notify accessory 404 at block 1014 that hibernation is about to begin, e.g., by sending the HibNotify command. At block 1016, power manager 416 can set the power output for line 417 to its hibernation level, which can be off by default. However, if accessory 404 requested hibernation power at block 1006, the hibernation level can be a nonzero power level. In some embodiments, the nonzero hibernation power level on line 417 can be the same as the power level when PCD 402 is awake. In other embodiments, it can be a lower power level (e.g., lower current limit or lower voltage). In some embodiments, the hibernation power level can be established based on the power instruction received from the accessory at block 1006.

At block 1018, PCD 402 can hibernate. As described above, hibernation can include reducing power to components of PCD 402, powering off components of PCD 402, disabling internal clocks, or other techniques for reducing power consumption.

At block 1020, PCD 402 determines whether a wake event has been detected. Various events can cause PCD 402 to wake from hibernation. For example, referring to FIG. 1, a user can press a designated button 106 on PCD 100 to wake the PCD. As another example, if PCD 402 has telephone capability, it may be configured to wake in response to an incoming call. As yet another example, PCD 402 can wake if an accessory becomes attached. For example, referring to FIG. 6, while PCD 402 is hibernating, sensor 424 can monitor accessory detection pin 610(6) to detect accessory attachment. This allows a connected accessory to wake a hibernating PCD by emulating a new attachment event.

PCD 402 can continue to hibernate at block 1018 until a wake event is detected at block 1020. In response to the wake event, PCD 402 can enable normal power output on line 417 (block 1022) and normal power delivery to other components of PCD 402. In some embodiments, re-enabling normal power output on line 417 can include briefly turning off power to line 417, then re-establishing power at the normal level. In some embodiments, this strobing of the power supplied to the accessory can occur in response to an accessory becoming attached, regardless of whether PCD 402 was hibernating when the accessory became attached.

At block 1024, PCD 402 determines whether an accessory has become attached. In some embodiments, PCD 402 does not distinguish between a new accessory becoming attached and emulation of an accessory detachment and re-attachment where the accessory never becomes physically detached (e.g., using wake event generator 700 described above). If no accessory is attached, at block 1026, PCD 402 can operate without an accessory. (An accessory can become attached later.) If an accessory is attached, process 1000 can return to block 1004 to establish a connection to the accessory. Process 1000 can continue indefinitely, e.g., until PCD 402 is shut down.

An accessory can exploit process 1000 to wake a connected PCD without requiring physical disconnection, e.g., using wake event generator 438 described above. Where the accessory relies on the PCD as a power source for wake event generator 438, the accessory can also request hibernation power from the PCD using the HibPowerRequest command. FIG. 11 is a flow diagram of a process 1100 for operating an accessory according to an embodiment of the present invention.

Process 1100 can start (block 1102) when an accessory (e.g., accessory 404 of FIG. 4) becomes attached to a PCD (e.g., PCD 402). In some embodiments, accessory 404 can start to draw operating power from PCD 402 upon becoming attached. At block 1104, accessory 404 can establish a connection to PCD 402, e.g., as described above with reference to block 1004 of FIG. 10. At block 1106, accessory 404 can send a power instruction to request that power continue to be provided during PCD hibernation, such as the HibPowerRequest command described above. This command can be sent as part of accessory identification or subsequently thereto.

At block 1108, accessory 404 can operate with PCD 402. As described above, the type of operations can depend on the particular accessory and PCD. Examples include accessory 404 receiving user input (e.g., keystroke events where accessory 404 includes a keyboard) and forwarding the received input to PCD 402, receiving and displaying media content or other output from PCD 402, receiving control signals from PCD 402 to control functionality of accessory 404 (e.g., operating a camera or microphone), sending control signals to PCD 402 to control functionality of PCD 402, and so on.

At block 1110, accessory 404 can determine whether PCD 402 has signaled that it is entering hibernation mode, e.g., by determining whether PCD 402 has sent the HibNotify command as described above. If not, accessory 404 can continue to operate with PCD 402 at block 1108. If PCD 402 has signaled that it is entering hibernation mode, then accessory 404 can wait for a user input event at block 1112. As described above, PCD 402 can continue to provide power to the accessory during hibernation, and accessory 404 can use the hibernation power to detect the user input event. In some embodiments, accessory 404 can retain the information that PCD 402 is hibernating, e.g., by establishing a logic high level on PCDHib signal path 712 of FIG. 7 in response to the HibNotify command. While waiting for the user input event, accessory 404 can operate at reduced power, e.g., consuming just enough power to enable detection of the user input event.

At block 1112, accessory 404 waits for a user input event to trigger waking of PCD 402. Depending on accessory 404, various types of interactions with accessory 404 can be detected as user input events. For example, if accessory 404 includes a keyboard, a user input event can be associated with the user pressing any key or with the user pressing a designated waking key. If accessory 404 includes a reader/writer for removable storage media (e.g., memory cards, USB drives, optical discs, etc.), a user input event can be associated with insertion of a storage medium into a receptacle of the reader/writer.

In one embodiment, logic within controller 430 of accessory 404 can detect the user input event and generate a User-Event signal in a logic high state on path 710 of FIG. 7. Alternatively, a separate hardware path can be provided to detect a user input event and drive the UserEvent signal to a logic high state without relying on controller 430; in such embodiments, controller 430 can be put into a low-power mode (or unpowered) while PCD 402 is hibernating. This can reduce the power consumption of accessory 404 during PCD hibernation.

When the user input event is detected, accessory 404 can generate a waking signal to PCD 402. For example, as shown in FIG. 7, when the UserEvent and PCDHib signals are both in logic high state, wake event generator 700 can open and then close the connection to pin 612(6), emulating detachment and reattachment of accessory 404 to PCD 402 without requiring physical detachment or reattachment. In this embodiment, PCD 402 can respond as if a new accessory had attached, and process 1100 can return to block 1104 to reestablish the connection to the PCD; at this point, the PCDHib signal on path 712 of FIG. 7 can be returned to the logic low state.

It will be appreciated that the processes described herein are illustrative and that variations and modifications are possible. Steps described as sequential may be executed in parallel, order of steps may be varied, and steps may be modified, combined, added or omitted. For instance, waking the PCD need not include emulating an accessory attachment event. In other embodiments, the connector interface between the PCD and accessory can provide a separate pin for signaling a waking event.

In some embodiments, re-establishing the connection between a PCD and an accessory can include an interruption in the power flow from the PCD to the accessory. While the interruption may be brief, the accessory may lose any data that is stored in volatile memory (e.g., registers, RAM, etc.). Thus, for example, if keyboard dock 200 of FIG. 2 is the accessory, keyboard dock 200 might not retain information about which key was pressed to awaken the PCD long enough to transmit the information to the PCD. If desired, the accessory can be designed to retain such information. For example, process 1100 can be modified so that the accessory stores information about the user input event (e.g., which key was pressed) into a nonvolatile storage medium prior to generating the waking signal to the PCD. After the connection is reestablished, the accessory can send the stored information about the user input event to the PCD.

In some embodiments, e.g., as shown in FIG. 2, an accessory can include a second interface (also referred to herein as a "rear interface," although no particular physical location is required) to allow a second accessory to connect. In some embodiments, the second accessory can also be designed to wake the PCD in response to a user interaction with the second accessory, and the first accessory can relay a wake event signal to the PCD to effect waking.

Figure 12:
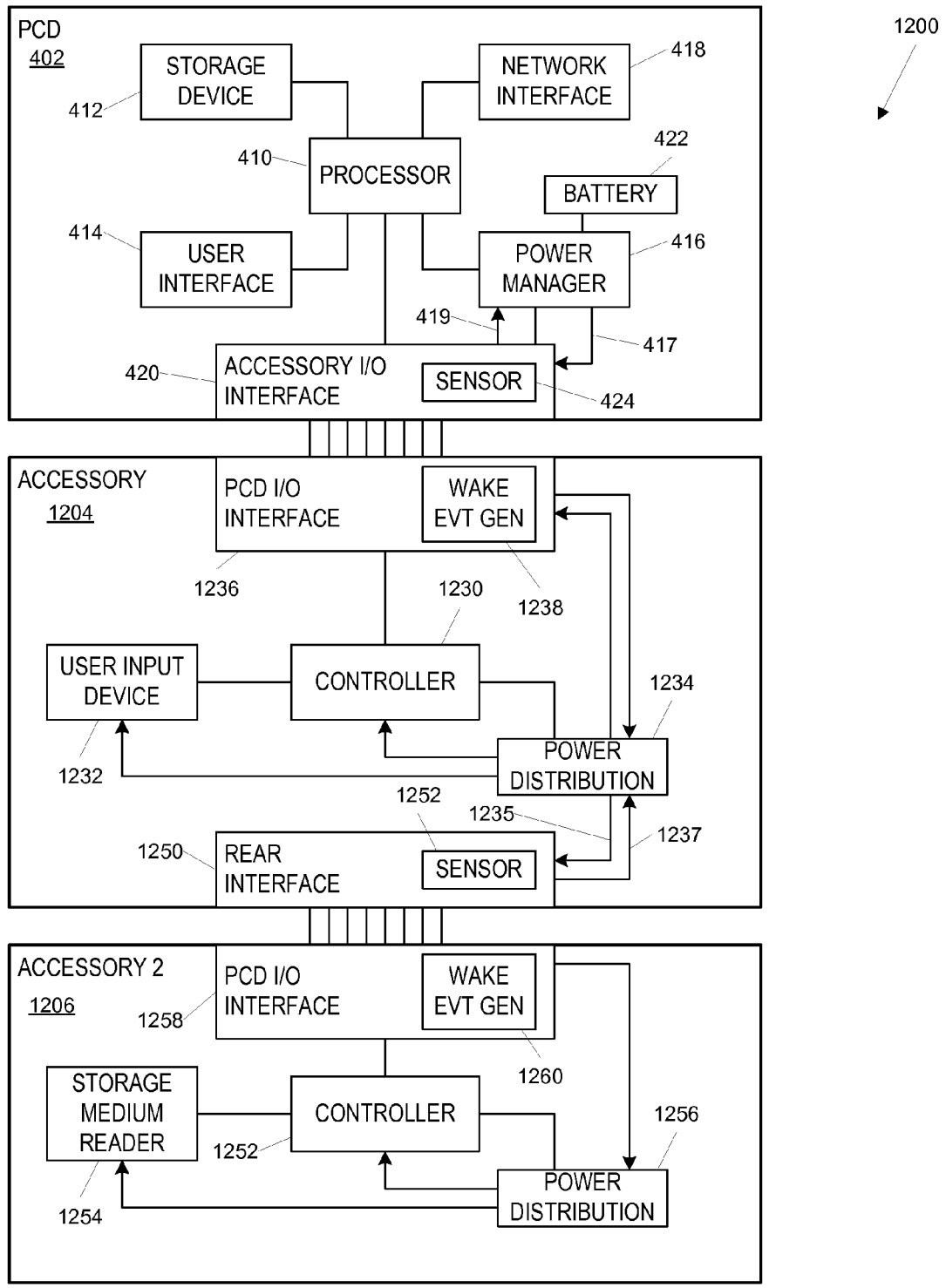
FIG. 12 is a block diagram of a system including a PCD connected to two accessories in a daisy chain according to an embodiment of the present invention.

More specifically, FIG. 12 is a block diagram of a system 1200 including PCD 402, first accessory 1204, and second accessory 1206 according to an embodiment of the present invention.

First accessory 1204 can be generally similar to accessory 404 of FIG. 4, including controller 1230, user input device 1232, power distribution module 1234, and PCD I/O interface 1236, all of which can operate similarly to corresponding components of accessory 404 of FIG. 4. First accessory 1204 can also include a rear interface 1250 capable of emulating accessory I/O interface 420 of PCD 402. Rear interface 1250 can include accessory sensor 1252, which can operate similarly to sensor 424 of PCD 402. In some embodiments, power distribution module 1234 can provide power, e.g., power received via PCD I/O interface 1236, to rear interface 1250 via line 1235 and can also receive power from rear interface 1250 via line 1237. First accessory 1206 can also include other components not shown in FIG. 12, such as media output devices, a power port, and the like.

Second accessory 1206 can also be generally similar to accessory 404 of FIG. 4, including controller 1252, power distribution module 1256, and PCD I/O interface 1258, all of which can operate similarly to corresponding components of accessory 404 of FIG. 4. In this embodiment, second accessory 1206 includes a storage medium reader 1254 that can include a receptacle to receive a removable storage medium. Various removable storage media can be supported, including optical discs (e.g., CD and/or DVD), memory cards (e.g., SD card), USB flash-memory drives, and so on. Storage medium reader can read from and/or write to storage media inserted into the receptacle, e.g., in response to instructions from PCD 402 that can be relayed by first accessory 1204.

PCD I/O interface 1258 can include a wake event generator 1260, which can operate similarly to wake event generators described above. Second accessory 1206 can also include other components not shown in FIG. 12, such as media output devices, user input devices, a power port, and the like.

In operation, first accessory 1204 can request to receive power from PCD 402 during PCD hibernation and can wake PCD 402 from hibernation in response to a user interaction with user input device 1232, in the manner described above, without regard for the presence or absence of second accessory 1206.

Second accessory 1206 can also request to receive power from PCD 402 during PCD hibernation and can wake PCD 402 from hibernation in response to a user interaction with user input device 1254. More specifically, accessory 1204 can send a HibPowerRequest command to PCD 402 via first accessory 1204. (Specific techniques for such indirect communication are described in above-referenced co-pending U.S. Provisional Patent Application No. 61/292,619.) In response, PCD 402 can configure power manager 416 to provide hibernation power and can also instruct first accessory 1204 that it should provide output power on its rear interface 1250 while PCD 402 is hibernating. Power distribution module 1234 in first accessory 1204 can be configured in response to this instruction.

When PCD 402 hibernates, if first accessory 1204 or second accessory 1206 has requested that power be provided during PCD hibernation, power manager 416 can supply the requested hibernation power via line 417 to accessory I/O interface 420. First accessory 1204 receives the power via PCD I/O interface 1236, and power distribution module 1234 can route power to rear interface 1250 on line 1235 (e.g., based on whether an instruction to provide output power during PCD hibernation was received), thus allowing accessory 1206 to receive power while PCD 402 is hibernating.

Second accessory 1206 can wake PCD 402 by operating wake event generator 1260 to emulate an accessory attachment event on rear interface 1250 of first accessory 1204, just as if second accessory 1206 were directly connected to PCD 402; the operation can be similar to that described above, with first accessory 1204 detecting the wake event (accessory attachment in this instance) at sensor 1252. Wake event generator 1238 in PCD I/O interface 1236 can be configured to respond to a wake event signal detected by sensor 1252 by generating its own wake event signal that can detected by sensor 424 in PCD 402, thus causing PCD 402 to wake from hibernation. For example, detection of a wake event by sensor 1252 can be processed by first accessory 1204 as a user input event that drives the UserEvent signal on path 710 of FIG. 7 to the logic high state. In some embodiments, both accessories 1204 and 1206 will need to reestablish their connections to PCD 402 after PCD 402 wakes.

It will be appreciated that the multi-accessory system described herein is illustrative and that variations and modifications are possible. More than two accessories can be connected to a PCD, extending the daisy chain arrangement of FIG. 12, and any connected accessory can wake the PCD. The particular wake event generator can also be modified; any signal that is recognizable by a particular PCD as indicating that it should wake from hibernation can be used as a wake event signal, and an accessory that receives a wake event signal on its rear interface can propagate that signal to its PCD interface.

Further, some accessories can have a second interface that has different functionality from a PCD/accessory interface. For example, an accessory may have a 3.5-mm audio jack, a USB connector, or the like. In some embodiments, the accessory can detect when a device connects to the second interface and generate a wake event signal in response to detecting such a connection.

While the invention has been described with respect to specific embodiments, one skilled in the art will recognize that numerous modifications are possible. For example, a "PCD" refers generally to any portable electronic device with any form of communication and/or media playback capability; a broad range of functionality may be incorporated. Similarly, the term "accessory" includes any electronic device capable of connecting with a PCD.

Some embodiments described above may make reference to a "user input event" such as a keystroke; however, other events or conditions detected at the accessory may also trigger waking of the PCD. For example, as noted above, a wake event can be triggered when an accessory detects a new connection to a second accessory on a rear port or insertion of a removable storage medium into a reader/writer. In other embodiments, an accessory can include environmental sensors such as light sensors, sound sensors, and/or motion sensors, and certain conditions detected by any of these sensors can trigger the generation of a wake event. Thus, for example, the accessory can wake the PCD on a transition from ambient darkness to ambient light. As another example, an accessory can include a clock or timer and can be programmed or otherwise configured to wake the PCD at a specific time or after a specific time interval has elapsed. Any condition or circumstance detectable by the accessory can be used as an accessory event that triggers waking of the PCD.

An accessory can wake a PCD from hibernation in a number of ways. Some embodiments above refer to opening and closing a connection to a pin of a connector to emulate an accessory becoming physically attached to the connector, but any other signal that the PCD can receive during hibernation and that induces the PCD to wake from hibernation can also be used as a wake event signal. In some embodiments, the PCD can wake from hibernation without interrupting power delivery to the accessory.

In addition, some embodiments described above may refer to a single hibernation mode and a single hibernation power level that is either supplied or not. Those skilled in the art with access to the present teachings will recognize that a PCD can have multiple hibernation modes, e.g., a "light sleep" state in which a display is powered down but other operations (e.g., audio or video output) can continue and a "deep sleep" state in which most components (including audio and video output) are powered down. In addition, during hibernation, some components can be intermittently powered. For example, an RF receiver can be briefly powered once every minute or two to detect an incoming phone call or other communication, with hibernation ending if such communication is detected. Where multiple hibernation modes are supported, the PCD can communicate to the accessory which hibernation mode is being entered, e.g., in the payload of a HibNotify command. In some embodiments, an accessory may selectively wake the PCD or not depending on which hibernation mode is entered.

Likewise, in some embodiments the PCD can provide multiple optional hibernation power levels for accessories, and an accessory may specify, e.g., in the payload of a HibPowerRequest command, which hibernation power level should be provided. Thus, accessories that require relatively little power while the PCD is hibernating can request a reduced hibernation power level relative to normal-mode power; for instance, current can be limited to 2 $\mu$A during hibernation rather than a normal-mode limit of 5 mA or 100 mA in a high-power mode. In some embodiments where a PCD has multiple hibernation modes, the accessory can also separately specify which, if any, level of hibernation power should be provided for each hibernation mode. Thus, for example, an accessory can request to receive hibernation power during a light sleep state but not during a deep sleep state.

In some embodiments, an accessory can draw power from a source other than the PCD, and the accessory can use that power during PCD hibernation rather than requesting hibernation power from the PCD, thereby allowing the PCD to conserve its own power. Thus, an accessory can wake a PCD from hibernation regardless of whether the PCD supplies power to the accessory during hibernation.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable media encoded with the program code may be packaged with a compatible electronic device, or the program code may be provided separately from electronic devices (e.g., via Internet download).

Thus, although the invention has been described with respect to specific embodiments, it will be appreciated that the invention is intended to cover all modifications and equivalents within the scope of the following claims.

What is claimed is:

1. A method of operating an accessory, the method comprising:
    establishing a connection to a portable computing device that is external to the accessory;
    receiving operating power from the portable computing device via the connection;
    communicating a command from the accessory to the portable computing device indicating that the accessory should continue to receive power from the portable computing device when the portable computing device is in a hibernation mode, wherein communicating a command indicating that the accessory should continue to receive power from the portable computing device when the portable computing device is in the hibernation mode includes specifying a level of power that should be provided to the accessory during the hibernation mode; and
    while the portable computing device is in the hibernation mode:
        continuing to receive operating power at the accessory from the portable computing device via the connection in response to the command;
        detecting, by the accessory, an accessory event; and
        in response to the accessory event, sending a wake event signal from the accessory to the portable computing device, wherein the wake event signal signals the portable computing device to wake from the hibernation mode.

2. The method of claim 1 wherein signaling the portable computing device to wake from the hibernation mode includes generating a signal that emulates detachment and reattachment of the accessory to a connector of the portable computing device.

3. The method of claim 1 wherein the accessory includes a keyboard and detecting the accessory event includes detecting a user pressing a key of the keyboard.

4. The method of claim 1 wherein the accessory includes a reader for a removable storage medium and detecting the accessory event includes detecting insertion of a removable storage medium into the reader.

5. The method of claim 1 further comprising receiving a hibernation notification from the portable computing device when the portable computing device enters the hibernation mode.

6. The method of claim 5 further comprising, in response to receiving the hibernation notification, operating the accessory at a reduced power level.

7. A non-transitory computer-readable storage medium containing program instructions which, when executed by a controller of an accessory, cause the accessory to execute a method comprising:
    establishing a connection to a portable computing device that is external to the accessory and that has a plurality of hibernation modes;
    receiving power at the accessory from the portable computing device via the connection;
    communicating a command from the accessory to the portable computing device indicating that the accessory should continue to receive power from the portable computing device when the portable computing device is in a first one of the plurality of hibernation modes, wherein communicating a command indicating that the accessory should continue to receive power from the portable computing device when the portable computing device is in the hibernation mode includes specifying a level of power that should be provided to the accessory during the hibernation mode; and
    while the portable computing device is in the first hibernation mode:
    continuing to receive power at the accessory from the portable computing device via the connection in response to the command;
    detecting, by the accessory, an accessory event; and
    in response to the accessory event, communicating a signal from the accessory to the portable computing device, the signal signaling the portable computing device to wake from the first hibernation mode.

8. The non-transitory computer-readable storage medium of claim 7 wherein communicating a command indicating that the accessory should continue to receive power from the portable computing device when the portable computing device is in a first one of the plurality of hibernation modes includes specifying a first power level to be provided when the portable computing device is in the first hibernation mode.

9. The non-transitory computer-readable storage medium of claim 8 wherein the method further comprises communicating to the portable computing device that the accessory should receive power from the portable computing device when the portable computing device is in a second one of the plurality of hibernation modes and specifying a second power level to be provided when the portable computing device is in the second hibernation mode.

10. The non-transitory computer-readable storage medium of claim 9 wherein the first power level and the second power level are different power levels.

11. The non-transitory computer readable storage medium of claim 7 wherein the method further comprises communicating to the portable computing device that the accessory should receive power from the portable computing device when the portable computing device is in a second one of the plurality of hibernation modes.

12. An accessory comprising:
    an input/output (I/O) interface configured to connect to a portable computing device that is external to the accessory and to receive power from the portable computing device, the I/O interface including a wake event generator; and
    a controller coupled to the I/O interface, the controller being configured to:
    send a request from the accessory to the portable computing device to request that the accessory receive power while the portable computing device is in a hibernation mode, wherein send a request includes specify a level of power that should be provided to the accessory during the hibernation mode;

receive a notification from the portable computing device indicating that the portable computing device is entering the hibernation mode;

receive power from the portable computing device via the input/output interface while the portable computing device is in a hibernation mode in response to the request;

determine that the portable computing device should be awakened from the hibernation mode; and control the wake event generator to generate a wake event signal in response to determining that the portable computing device should be awakened.

13. The accessory of claim 12 further comprising a user input device configured to provide user input signals to the controller, wherein the controller is further configured to determine that the portable computing device should be awakened in response to a user input signal.

14. The accessory of claim 13 wherein the user input device comprises a keyboard.

15. The accessory of claim 12 further comprising a storage medium receptacle configured to receive a removable storage medium and wherein the controller is further configured to determine that the portable computing device should be awakened in response to a removable storage medium being inserted into the storage medium receptacle.

16. The accessory of claim 12 further comprising a second interface configured to connect to a second accessory and wherein the controller is further configured to determine that the portable computing device should be awakened in response to a signal received from the second interface.

17. The accessory of claim 12 further comprising a second interface configured to connect to another device and wherein the controller is further configured to determine that the portable computing device should be awakened in response to detecting that another device has become connected to the second interface.

18. The accessory of claim 12 wherein the I/O interface comprises a connector including a plurality of pins, a first pin of the plurality of pins being used for accessory detection, and wherein the wake event generator is configured to open and close a connection to the first pin.

19. A method of operating a portable computing device, the method comprising:

establishing a connection to an accessory that is external to the portable computing device, wherein establishing the connection includes providing power to the accessory via a power pin of the portable computing device;

determining whether the accessory requests hibernation power and whether the request specifies a level of power that should be provided to the accessory during the hibernation mode; and entering a hibernation mode, wherein entering the hibernation mode includes continuing to provide power to the accessory at the specified level of power if the accessory requested hibernation power and discontinuing providing power to the accessory if the accessory did not request hibernation power.

20. The method of claim 19 further comprising:

while in the hibernation mode, receiving a wake event signal from the accessory; and transitioning from the hibernation mode to a normal operating mode in response to the wake event signal.

21. The method of claim 20 wherein transitioning from the hibernation mode to the normal operating mode includes re-establishing the connection to the accessory.

22. The method of claim 21 wherein re-establishing the connection to the accessory includes strobing the power provided to the accessory via the power pin.

23. The method of claim 19 wherein continuing to provide power to the accessory includes providing power to the accessory at a reduced power level.

24. A portable computing device comprising:

a processor;

an accessory input/output (I/O) interface coupled to the processor and configured to connect to an accessory that is external to the portable computing device; and a power manager configured to deliver power from a power source to the accessory I/O interface and the processor, the power manager being further configured to put the portable computing device into a hibernation mode and to return the portable computing device from the hibernation mode to a normal operating mode, wherein the processor is configured to:

instruct the power manager to provide power from the power source to the accessory via the accessory I/O interface;

receive a request for hibernation power from the accessory via the accessory I/O interface, the request specifying a level of power that should be provided to the accessory during the hibernation mode; and in response to the request, instruct the power manager to continue to provide power to the accessory at the specified level of power while in the hibernation mode, and wherein the power manager is further configured such that upon entering the hibernation mode, providing of power to the accessory is discontinued unless the instruction to continue to provide power to the accessory was received prior to entering the hibernation mode.

25. The portable computing device of claim 24 wherein the accessory I/O interface includes an accessory sensor configured to detect an attachment signal from an accessory and wherein the accessory sensor is further configured to send a wake event signal to the power manager in the event that attachment of the accessory is detected while the power manager is in the hibernation mode.

26. The portable computing device of claim 24 wherein the power manager is further configured to provide power to the accessory at a first level while in the normal operating mode and to provide power to the accessory at a second level while in the hibernation mode, the second level being a lower level than the first level.

* * * * *